No. 764,753. PATENTED JULY 12, 1904.
J. M. McCLELLON.
LOCOMOTIVE BOILER.
APPLICATION FILED DEC. 4, 1903.
NO MODEL. 9 SHEETS—SHEET 4.
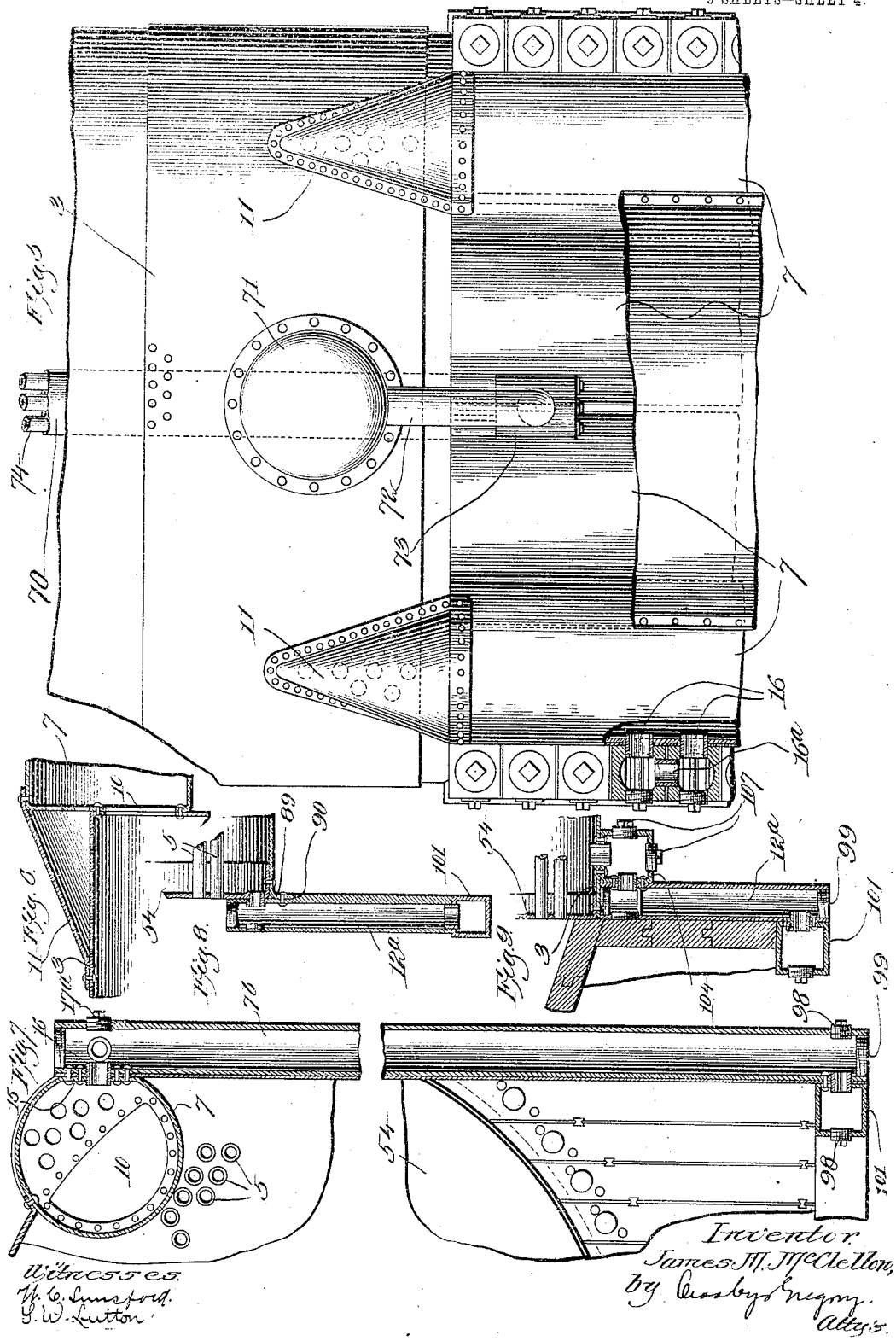
Witnesses.
W. C. Lunsford.
G. W. Lutton.
Inventor.
James M. McClellon,
By Crosby & Gregory,
Attys.

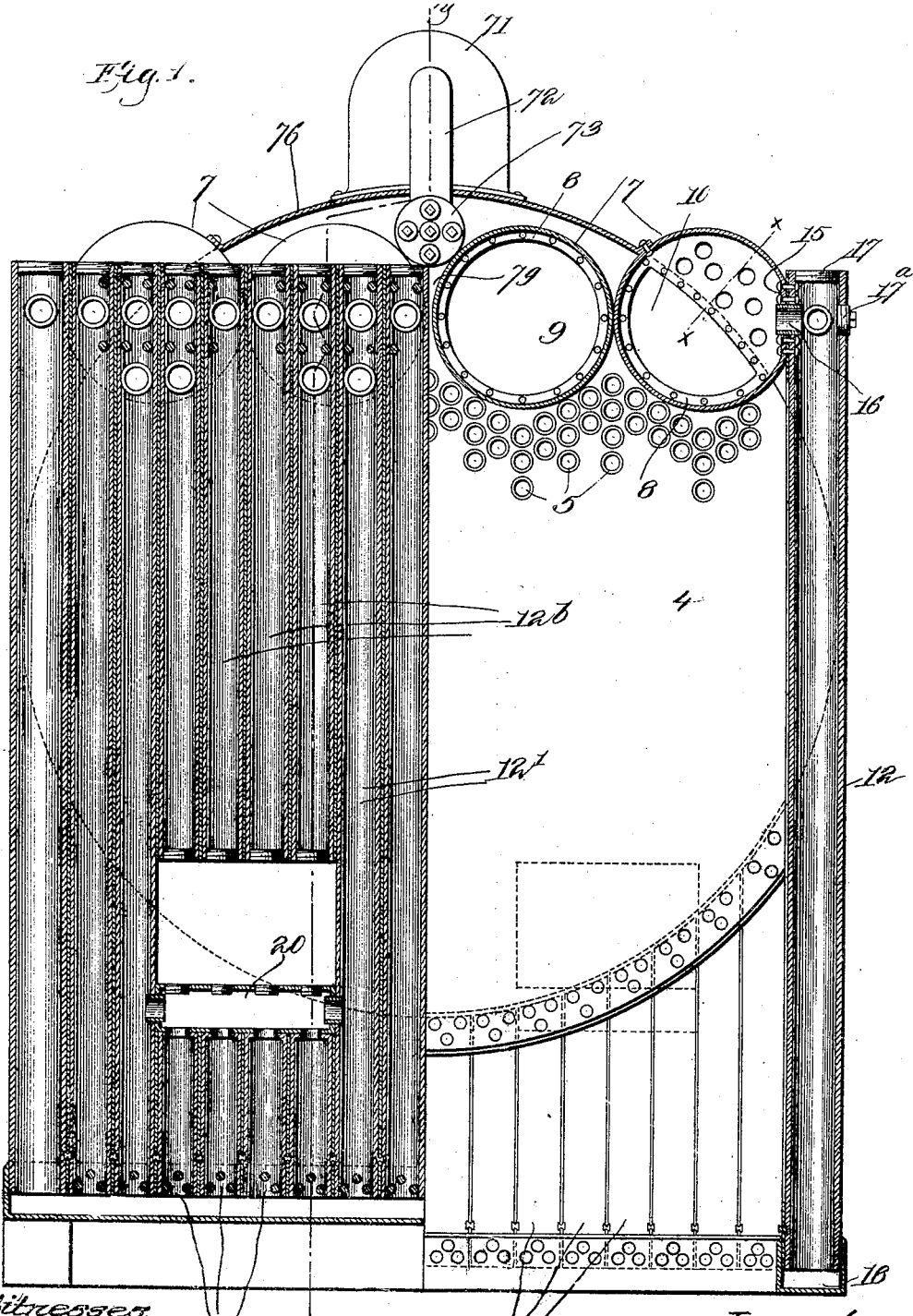

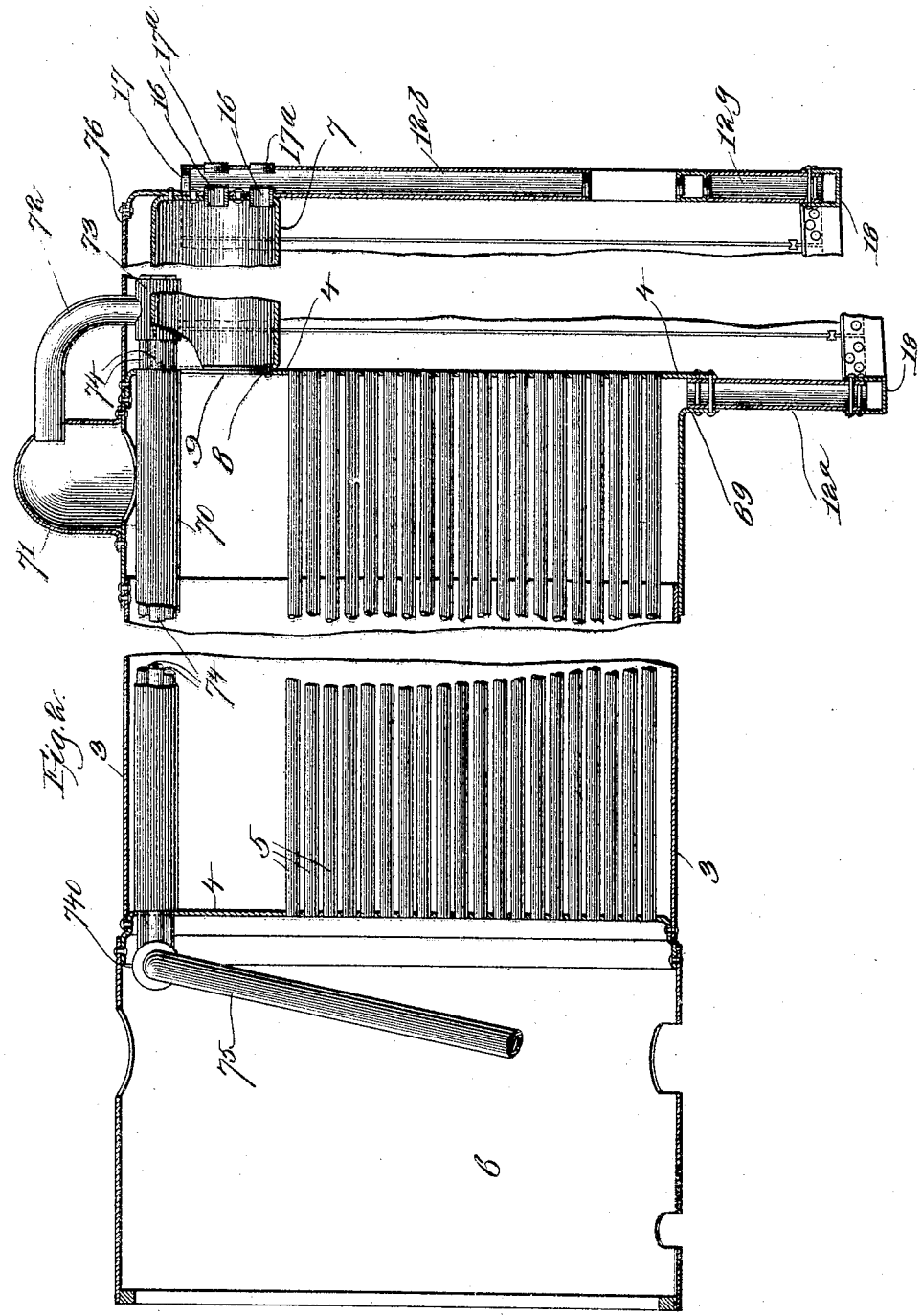

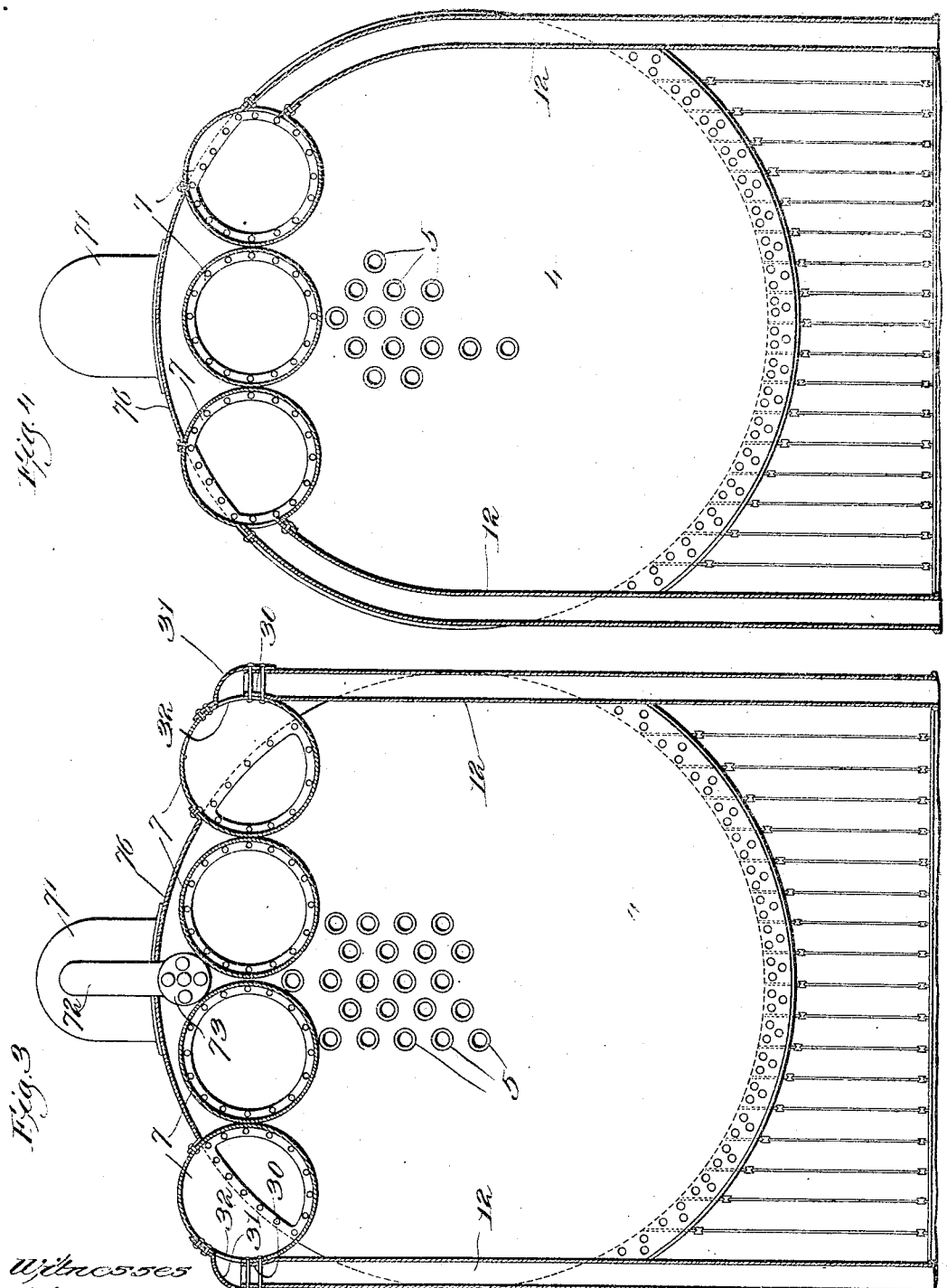

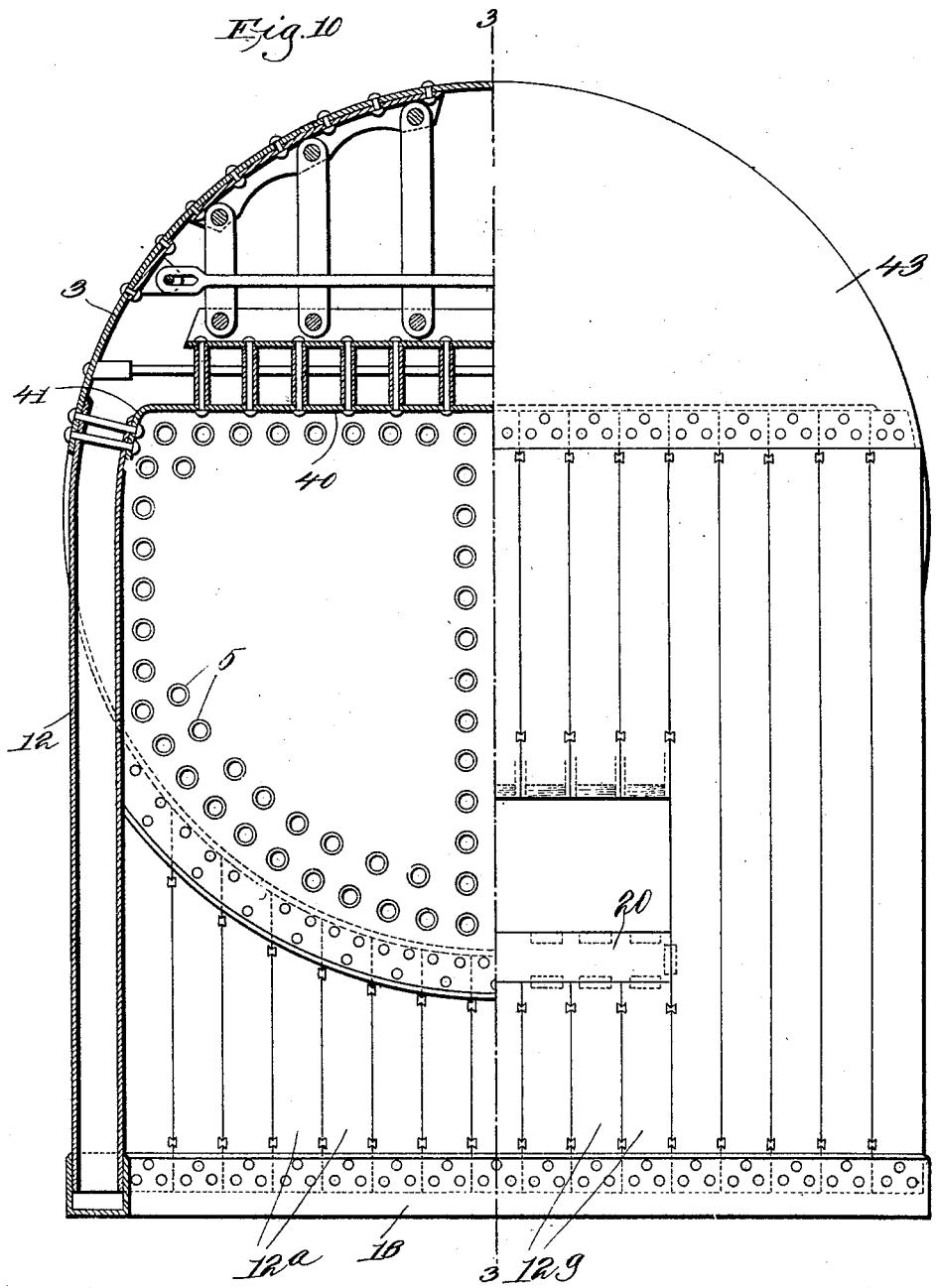

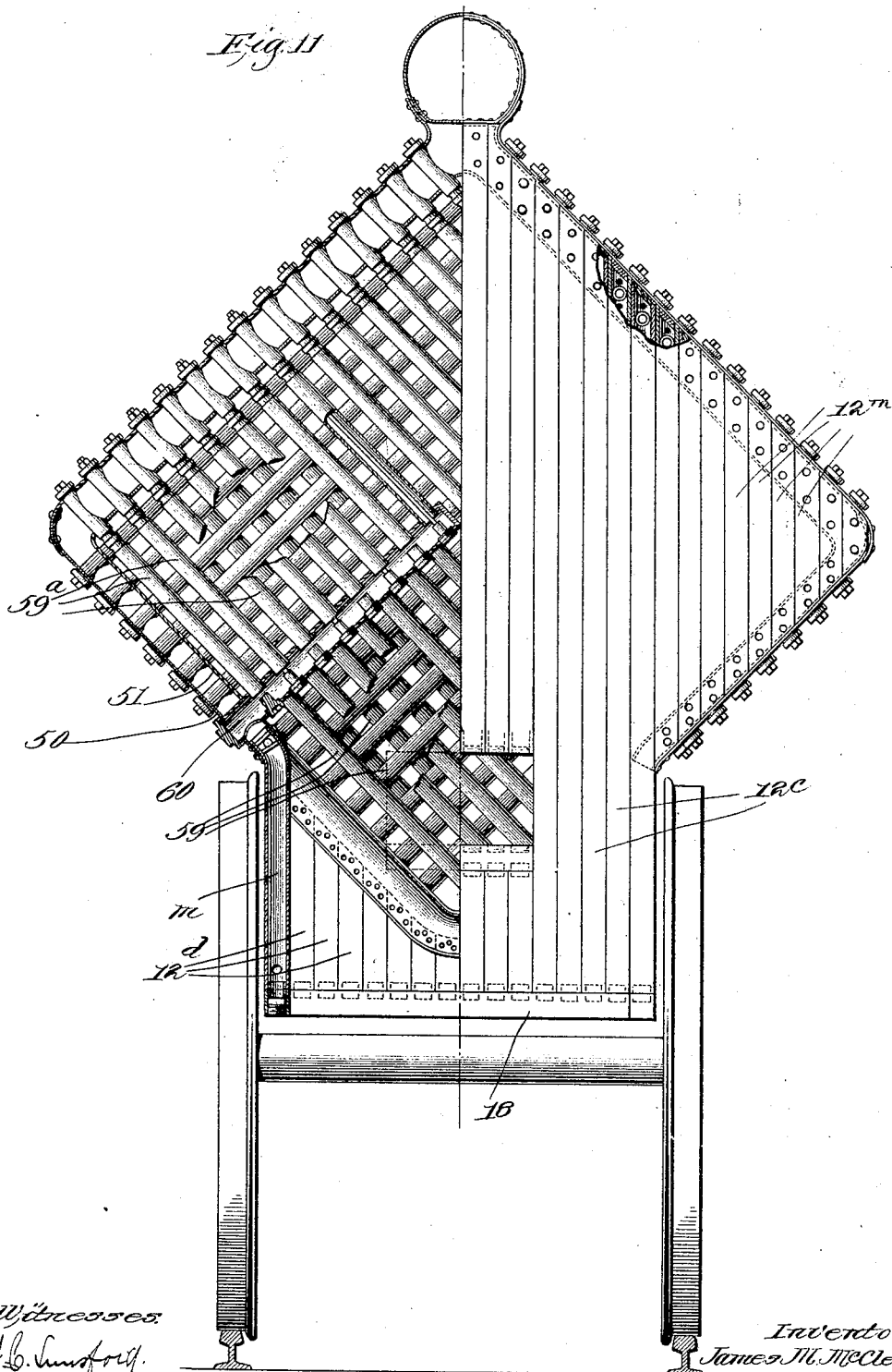

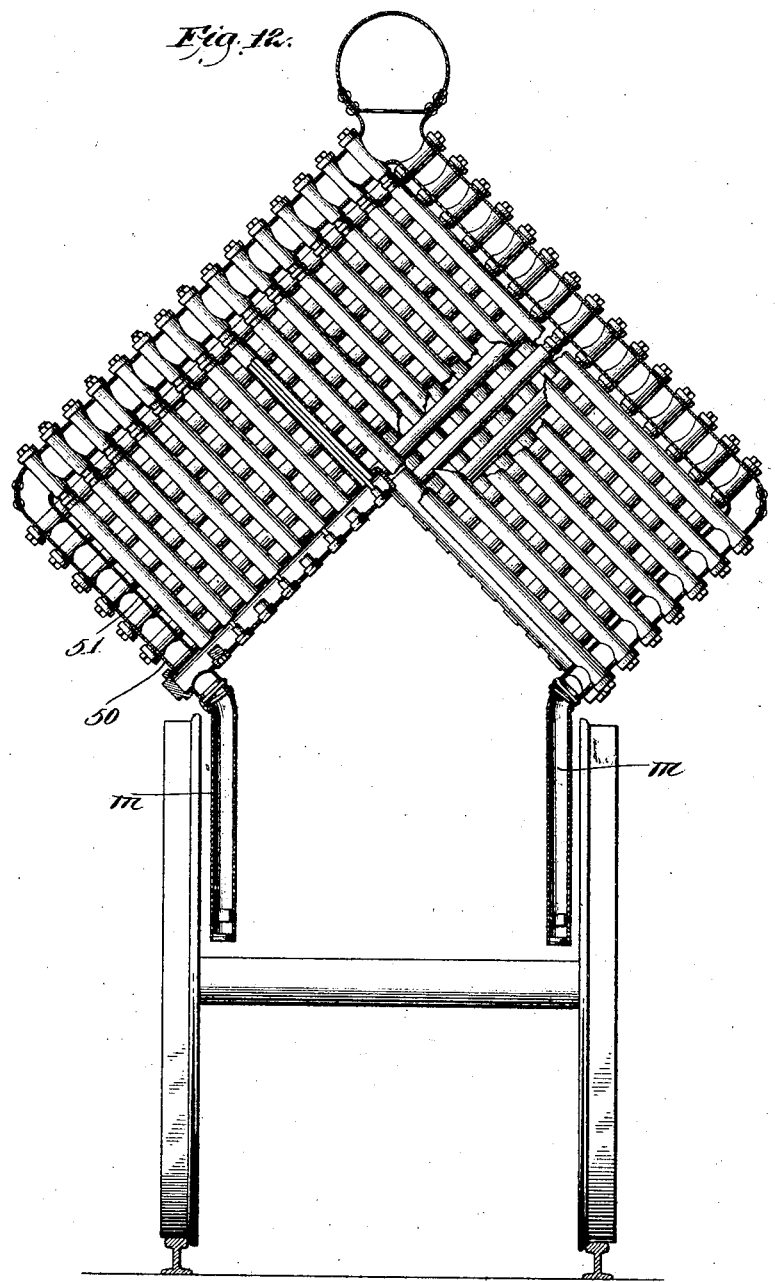

No. 764,753. PATENTED JULY 12, 1904.
J. M. McCLELLON.
LOCOMOTIVE BOILER.
APPLICATION FILED DEC. 4, 1903.
NO MODEL. 9 SHEETS—SHEET 8.
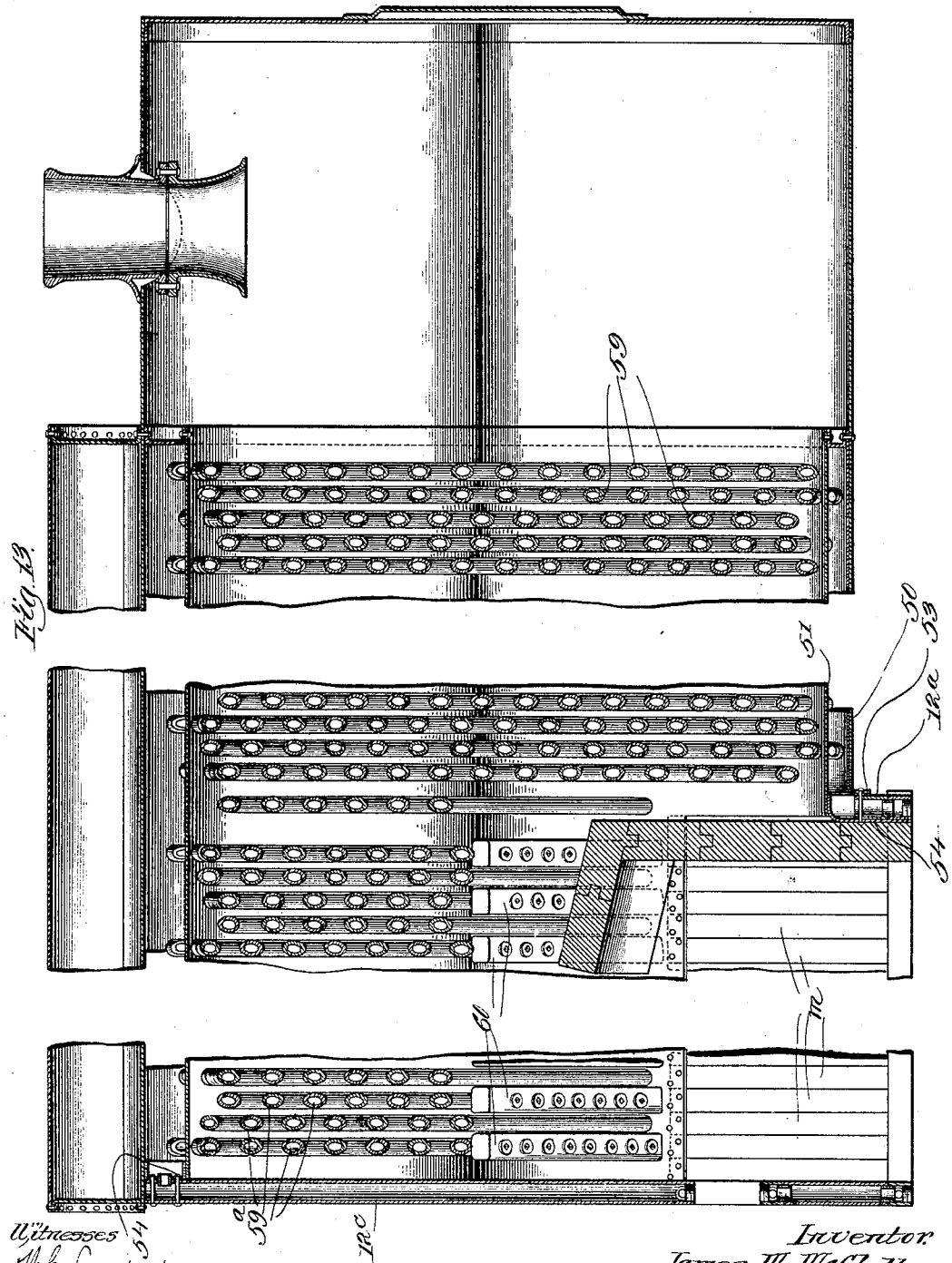

No. 764,753. PATENTED JULY 12, 1904.
J. M. McCLELLON.
LOCOMOTIVE BOILER.
APPLICATION FILED DEC. 4, 1903.
NO MODEL. 9 SHEETS—SHEET 9.
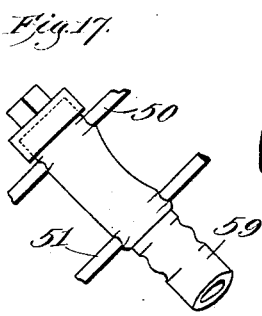
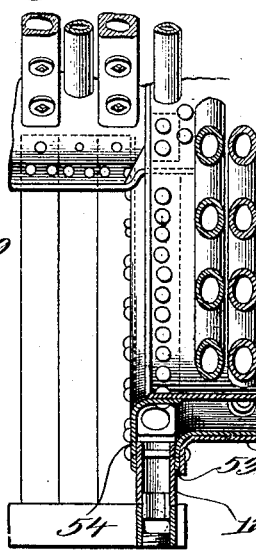
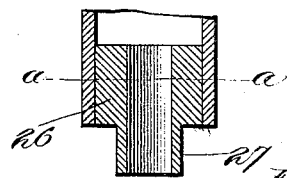
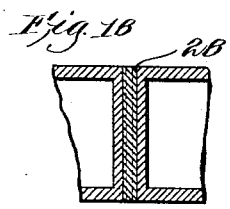
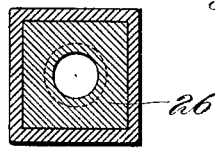
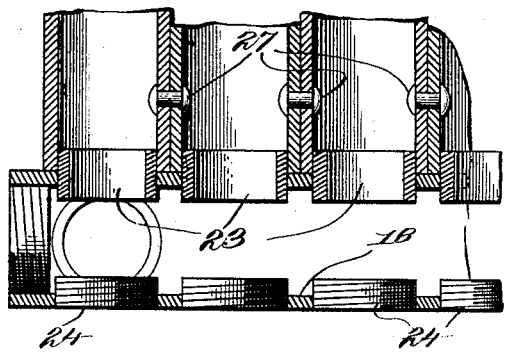
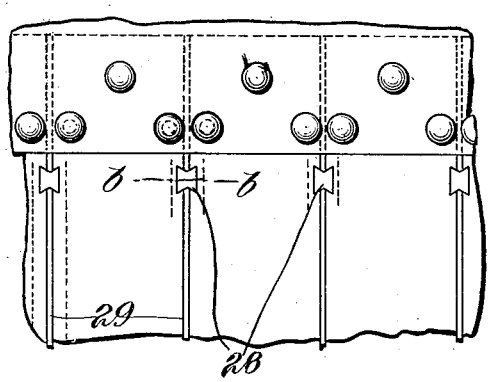
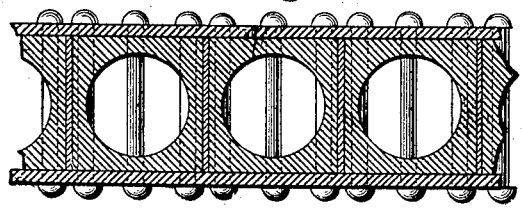
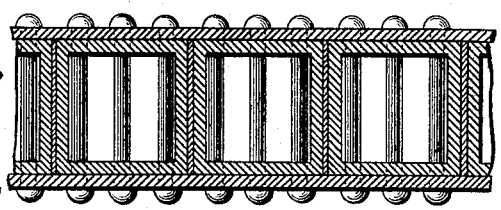
Witnesses:
W. C. Lunsford.
T. W. Lutton.
Inventor:
James M. McClellon,
by Crosby & Gregory.
Attys.

No. 764,753. Patented July 12, 1904.

UNITED STATES PATENT OFFICE.

JAMES M. McCLELLON, OF EVERETT, MASSACHUSETTS.

LOCOMOTIVE-BOILER.

SPECIFICATION forming part of Letters Patent No. 764,753, dated July 12, 1904.

Application filed December 4, 1903. Serial No. 183,738. (No model.)

*To all whom it may concern:*

Be it known that I, JAMES M. MCCLELLON, a citizen of the United States, residing at Everett, county of Suffolk, and State of Massachusetts, have invented an Improvement in Locomotive-Boilers, of which the following description, in connection with the accompanying drawings, is a specification, like characters on the drawings representing like parts.

This invention relates to locomotive-boilers, and especially to the fire-box construction, the object of the invention being to provide a novel fire-box in which the use of stay-bolts is entirely avoided.

It is a well-known fact that in the present style of locomotive the stay-bolts around the fire-box are constantly becoming broken, thus weakening the structure and opening the way for dangerous explosions. I avoid the use of stay-bolts by substituting for the crown-sheet a surface which has to be carefully stayed, a plurality of drums which are connected with the water-space of the boiler, and by further substituting for the usual water-legs around the sides of the fire-box rows of engaging water-tubes, which at their upper ends are secured to and communicate with the drums and at their lower ends are secured to suitable headers.

My improved fire-box construction can be used in connection with any boiler, whether stationary or movable, and also with any type of locomotive-boiler, either a tubular boiler or a water-tube boiler.

In Figures 1 to 7 I have shown my invention applied to a tubular locomotive-boiler of the ordinary type in which the flues run longitudinally. Fig. 1 is a vertical section through the fire-box of a locomotive-boiler, showing one form of my invention, said section being taken in two different planes. Fig. 2 is a section on the line *y y*, Fig. 1. Figs. 3 and 4 are vertical sections through a locomotive fire-box, showing different forms that my invention may assume. Fig. 5 is a plan view of a portion of the boiler shown in Figs. 1 and 2. Fig. 6 is a section on the line *x x*, Fig. 1. Figs. 7, 8, and 9 show modifications of the invention which will be more fully hereinafter described. Fig. 10 shows another way in which my invention may be applied to the ordinary locomotive-boiler. Fig. 11 is a part elevation and part section through a different style of locomotive-boiler having my invention applied thereto. Fig. 12 is a transverse vertical section taken through the fire-box. Fig. 13 is a vertical central section of the locomotive-boiler shown in Figs. 8 to 10. Fig. 14 is a detail. Figs. 15 and 16 are views showing one form of tube for the fire-box walls, and one form of tube, Fig. 16, being a section on the line *a a*, Fig. 15. Fig. 17 is a detail to be hereinafter described. Fig. 18 is a section on *b b*, Fig. 20. Fig. 19 shows one way of attaching the water-tubes forming the side walls of the fire-box to the header. Fig. 20 is an enlarged view showing the manner of securing the water-tubes to the shells of the boiler and also one way of tying the water-tubes together. Figs. 21 and 22 are sectional views showing different shapes of water-tubes.

Referring now to Figs. 1 and 2, 3 designates the shell of an ordinary locomotive-boiler having at each end the usual flue-sheet 4 and the usual flues 5, through which the products of combustion pass from the fire-box to the smoke-chamber 6. In place of the usual crown-sheet forming the top of the combustion-chamber I substitute a plurality of drums 7, which are preferably arranged to extend longitudinally of the boiler. As shown in the form of the invention shown in Figs. 1 and 2, four such drums are employed, although the number may be varied without departing from the invention. These drums are preferably cylindrical in cross-section, so that there will be no necessity for staying them. At their rear ends they are connected in some suitable way, as by rivets, to the front flue-sheet 4 and at their front ends are provided with suitable heads. These drums may be made in any suitable way, and the heads may be either integral therewith or separate pieces riveted thereto. Where the drums are arranged as shown in Fig. 1, the two center drums are situated entirely within the area of the front flue-sheet 4 and are provided with the inturned flanges 8, which are riveted to the flue-sheet, said sheet having the opening 9 to correspond with the open end of the drum. In this way the two center drums are in constant communication with the interior of the shell 3. The two outside drums are shown as extending partially outside of the flue-sheet. At the places where the outside drums overlap the flue-sheet the latter, as well as the corresponding portion of the end of the drum, is cut away, as at 10, to provide communication between the interior of the shell and the interior of the drum. The portion of the drum which overlaps the boiler-shell is provided with an inturned flange 8, which is riveted or otherwise secured to the flue-sheet. 11 designates extension or stiffening members which are rigidly secured to the portions of the outside drums which stand above the boiler-shell and extend backwardly partially over the boiler-shell, as best seen in Figs. 5 and 6. These stiffening members may either be extensions of the drums or separate pieces riveted thereto, as shown in Fig. 5. The object of these members is to add strength to the structure and assist in preventing the front ends of the drums from sagging. The shell beneath the said members 11, as well as the end of the drum, may be perforated, if desired. The side walls of the fire-box are formed by water-tubes 12, 12', and 12$^a$, which are placed in contact with each other and are herein illustrated as extending vertically. The water-tubes 12 at the sides of the fire-box are secured at their upper ends to the sides of the outside drums 7. Those, 12', at the front or door end of the fire-box are secured at their upper ends to the ends of the drums. Those forming the back of the fire-box may be secured at their upper ends to the flue-sheet or to a header which is curved to fit the boiler-shell or to any other suitable part. These water-tubes may have any cross-sectional contour; but I prefer to have tubes which are square exteriorly in cross-section, as they can be more easily and firmly secured to the drums.

In the form of the invention illustrated in Figs. 1, 2, and 7 the outer sides of the outside drums 7 are flattened, as at 15, and the flat sides of the upper ends of the water-tubes 12, forming the sides of the fire-box, are secured to such flattened sides of the drums. I prefer to accomplish this by riveting and nippling the flat sides of the tubes to the flattened sides of the drums, as this makes an exceedingly strong connection and at the same time affords the necessary communication between the drums and each tube. The nipples which connect the tubes to the drums are designated by 16, and in order to facilitate the removal or insertion of a nipple the outer sides of each tube may be provided with an aperture which is closed by a suitable plug 17$^a$. With this construction the rivets take all the strain off from the nipple, so that all danger of a leak occurring around the nipple is obviated. The upper ends of the drums are closed by suitable plugs 17. I prefer also to connect the upper ends of adjacent tubes by means of a suitable nipple 16$^a$, as seen in Fig. 5, so that there is a free circulation between the tubes. The ends of the drums 7 are made substantially flat, and the upper ends of the water-tubes 12' at the front or door end of the fire-box are preferably riveted and nippled to such flat ends of the drums, the same as the side tubes 12 are to the sides of the drums.

The tubes 12$^a$ at the back of the fire-box may be supported at their upper ends in various ways. In Figs. 1 and 2 I have illustrated the upper ends of such tubes as riveted between the lower edge of the front flue-sheet 4 and a downturned flange 89 on the front edge of the boiler-shell. In Fig. 8 the upper ends of the tubes 12$^a$ are extended above the lower edge of the flue-sheet and are nippled thereto. The flange 89 on the front edge of the boiler-shell rests on a shoulder 90, formed on the back side of each of the tubes 12$^a$, and said flange is riveted or otherwise rigidly secured to each of the tubes. With this construction the weight of the front edge of the boiler-shell is taken by the tubes 12$^a$ and the nipples are relieved from all strain. In Fig. 9 the upper end of the tubes 12$^a$ are nippled and preferably riveted to a header 104, which extends around underneath the boiler-shell and is curved to fit the same. Said header 104 will be riveted and nippled to the boiler-shell so that there is a free communication through the header between each tube 12$^a$ and the boiler-shell. In Fig. 9 I have illustrated the upper end of the tubes 12$^a$ as closed by plugs and the boiler-shell 3 as extended over the ends of the tubes. The header 104 may have suitable plugs 107 opposite each of the nipples to facilitate the removal or insertion of them. The lower ends of the water-tubes are secured to a suitable header which extends entirely around the fire-box.

Various forms of headers may be employed, and in Figs. 1 and 2 I have illustrated a header 18 having a substantially U shape or channel-iron shape into the open end of which the lower ends of the tubes are received and to which said tubes are riveted. Since the tubes are square exteriorly in cross-section, their sides form a straight wall to which the sides of the channel-iron may be riveted and form a water and steam tight joint.

In Figs. 7 and 9 a flat-sided header is illustrated, to the flat side of which the flat sides of the lower end of the water-tubes are nippled and riveted. Such flat-sided header may be either situated inside or outside of the tubes, and in Figs. 7 and 9 I have illustrated it on the inside thereof. With this construction the lower ends of each of the water-tubes will be closed by a suitable plug 99, and both the header and the water-tubes may be provided with apertures opposite the nipples, which apertures are closed by other removable plugs 98.

The fire-box illustrated in Fig. 1 has two doors. Above each of these doors are a plurality of drop-tubes 12$^b$. The sill of the door is formed by a header 20, to which short tubes 12$^g$ are secured by means of nipples. Said header has communication through its ends with the tubes at either side of the door. This construction is employed so as to prevent there being any dead water in any of the tubes.

As stated above, the tubes 12 may assume various shapes in cross-sectional contour, although I prefer the tubes that are square exteriorly. These tubes may either be square or round interiorly. In Fig. 22 I have illustrated a section showing the tubes which are square both exteriorly and interiorly, said figure also being a section through the sides of the header and showing the tubes riveted thereto. This construction is preferred because it allows larger water-spaces on the interior of the tubes and avoids the necessity of expanding the ends of the tubes into the header. In Fig. 21 a form of the tube which is round interiorly is illustrated.

In place of the channel-iron headers I may employ tubular headers, in which case each of the tubes 12 will have to be expanded into the header in some suitable way. As shown in Fig. 19, which illustrates the tubes square exteriorly, but round interiorly, suitable nipples 23 are expanded into the lower ends of each of the tubes and also into the apertures in the header 18. In this latter case the header will be provided with plugs 24 opposite each tube, so as to permit any one tube to be removed without disturbing the other tubes.

In Figs. 15 and 16 I have illustrated a tube which is both square exteriorly and interiorly and which has at its end the bushing 26, which is provided with the nipple or neck portion 27, the latter being adapted to be inserted into an opening in the header or drum and to be expanded therein.

Other forms of tube than those herein illustrated may be employed without departing from my invention.

In order to strengthen the fire-box, I propose to tie together the contacting tubes. In Fig. 19 this is accomplished by means of rivets 27 and in Figs. 18 and 21 by dovetailed key-pieces 28, which fit corresponding grooves in the contacting sides of adjacent tubes. I prefer the dovetailed keyways rather than the rivets, because of the ease with which each key-piece may be inserted or removed. To make a tight joint between the adjacent tubes, I may employ a suitable calking-strip 29 of copper or similar material.

In Fig. 3 I have illustrated a different way of securing the water-tubes at the sides of the fire-box to the drum. In this form of my invention the drums are not flattened, as in Fig. 1, but instead the inner sides of the tubes are curved at their upper ends to fit the drums, as at 30, and a strip or sheet of metal 31 is riveted at one edge to the drum and at the other to the outer face of the tubes. Communication between each tube and the corresponding drum is afforded by providing the sides of the drums with suitable apertures 32.

In Fig. 4 I have illustrated only three drums, and the tubes 12, forming the sides of the fire-box, are curved inwardly at their upper ends to correspond with the curvature of the boiler-shell 3. The upper ends of said tubes are suitably secured to the drums by riveting or otherwise, and each tube has communication with the corresponding drum.

In Fig. 10 I have illustrated one way of applying my invention to the ordinary boiler in which the usual crown-sheet 40 is employed. In this form of the invention the tubes 12, forming the sides of the fire-box, are at their upper ends riveted between the downturned flange 41 at the edge of the crown-sheet and the edge of the portion of the shell 3 which extends over the fire-box. At the front or door end of the fire-box the tubes are riveted between a downturned flange on the front edge of the crown-sheet and the lower edge of the semicylindrical head 43 of the boiler-shell. Another way of applying this feature of my invention to the ordinary boiler as now constructed, in which a crown-sheet is used, is to flatten the sides of the boiler-shell in a manner similar to that in which the sides of the drums are flattened in Figs. 1 and 7 and placing the flat-sided tubes 12 at the sides of the fire-box, so that their upper ends overlie the flattened sides of the shell, and thereafter riveting and nippling the sides of such tubes to the flattened sides of the boiler-shell in the same way that the tubes are riveted and nippled to the flat drums in Figs. 1 to 7. This feature of my invention I consider as very important, and although I have herein illustrated it as used in the fire-box portion of a locomotive-boiler, yet I do not wish to be limited to its use in this particular place, for it will be seen that this construction presents, broadly, a boiler having a steam and water space provided with flattened sides and flat-sided water-tubes having their sides riveted and nippled to the flat side of said chamber. Such a construction can also be used in the type of boiler illustrated in my copending application, Serial No. 165,112, filed July 11, 1903, for securing the water-tubes, which form the sides of the flue to the sides of the drums forming the top of the flue. This feature of my invention is also applicable to many other types of boiler, such as marine stationary boilers, where the sides of the boiler are formed by closely-arranged water-tubes and the top by one or more drums to which the tubes are secured. In this form of the boiler of course the crown-sheet will have to be stayed by any usual means.

In Figs. 11 to 13 I have illustrated my improved fire-box as applied to the form of locomotive-boiler illustrated in my Patent No. 741,529, dated October 13, 1903. This form of boiler comprises the concentric shells, rectangular in cross-section and forming between them a water-chamber, the inner shell constituting a flue, and a plurality of rows of inclined tubes extending across the inner shell and connecting the opposite water-spaces. In said patent the shells are formed at one end to form the fire-box. In applying my present improvements to said type of boiler I employ for the sides of the fire-box the water-tubes $m$, which at their upper ends are bent outwardly, as shown in Figs. 11 and 12, and are riveted or otherwise secured between the lower edges of the shells 50 and 51. The back of the fire-box is formed by similar tubes $12^d$, which are secured at their upper ends between the downturned flanges 53 and 54 of the two shells 50 and 51. The front or door end of the fire-box is also formed by vertically-arranged water-tubes. The water-tubes $12^c$, which are within the width of the fire-box, extend from the lower end thereof clear to the top of the boiler, as shown in Fig. 11. Outside of the width of the fire-box the end of the boiler is formed by short tubes $12^m$. The tubes $12^c$ are secured at their lower ends to a suitable header 18. At their upper ends said tubes are riveted and nippled to a filling-piece 54, which is substantially channel-iron in shape and is riveted between the two shells 50 and 51 at their forward edges. This filling-piece extends from the point where the shells diverge from the fire-box at the upper end of the tubes $m$ clear to the top of the boiler. The short tubes $12^m$ are riveted and nippled both at their upper and lower ends to such filling-piece. In this form of boiler the sides of the shell do not need any special staying, because the water-tubes 59 operate both as water-tubes and as staying means, all as described in said patent. In constructing the boiler I prefer to make the ends of the tubes 59 where they pass through the two shells slightly larger and thicker than the body of the tube, as seen in Fig. 17, this construction adding strength to the boiler. Certain of the tubes $59^a$ in the fire-box portion of the boiler and over the combustion-chamber are shorter than the other tubes and are expanded at their lower ends into headers 60, which are arranged at an angle of forty-five degrees and at their lower ends are expanded into the two shells 50 and 51 and have communication with the water-spaces between the shells.

In all the forms of my invention which are illustrated in the drawings and to which I have above referred the shell which incloses the steam and water space of the boiler (whether said shell is in the form of a drum or is cylindrical, as in the ordinary construction of boiler, or rectangular in cross-section or any other shape) is flattened at that place where the water-tubes are secured thereto. This feature is one of the important features of my invention, for by flattening the shell of the boiler and using flat-sided tubes which are riveted or secured directly to the shell an absolutely tight joint between the tubes and shell can be easily made. I therefore desire to claim this feature broadly irrespective of the character or shape of shell and also regardless of the particular shape of tubes, provided they are flat-sided tubes.

I have herein illustrated tubes which are square exteriorly; but my invention is not limited to this shape, as any flat tubes can be used in connection with the flattened shells for making a tight joint.

In the ordinary construction of locomotive-boiler the steam-pipe extends from the steam-dome toward the front of the boiler through the steam-space at the top of the boiler, and during the motion of the locomotive the water in the boiler is very liable to splash onto such steam-pipe, thus cooling the same, and consequently the steam therein. To avoid this difficulty, I have provided within the boiler-shell a shield or protector-pipe through which the steam-pipe is taken and have also provided means for conducting through said protector-pipe around the steam-pipe hot gases of combustion, which serve to superheat the steam. The protector-pipe protects the steam-pipe from any splashing water in the boiler. In Fig. 2 the protector-pipe is designated by 70, and it extends from one flue-sheet to the other. 71 indicates the usual steam-dome, and 72 a steam-pipe leading into the dome from which the steam is taken. This steam-pipe leads into a header 73, situated outside of the boiler-shell and to which are connected one or more steam-pipes 74. These pipes extend through the protector-pipe 70 and into the smoke-chamber 6, said pipes being connected to a suitable header 740. From this header the usual branch pipes 75 lead to the engine-cylinders. 76 designates a finishing-sheet which is secured at its edges to the outside drums 7 and covers the inner drums and the header 73.

Means are provided whereby part of the gases of combustion from the combustion-chamber are taken into the space beneath the finishing-sheet 76 and pass from said space through the protector-pipe 70 to the smoke-chamber. As shown in Fig. 1, this is accomplished by separating the two inner drums slightly, so that there exists a space 79 between them, through which products of combustion pass into the space beneath the finishing-sheet. These products of combustion passing around the steam-pipe 74 and through the protector-pipe 70 serve to superheat the steam therein.

I do not herein claim the means just described for superheating the steam, as it has been the subject-matter of a separate application.

In all of the above forms of my invention and in other forms of boilers in which my invention may be embodied it will be noted that the fire-box is so constructed that it is not necessary to use any stay-bolts whatever in its sides. Where the drums are used in the form of boiler shown in Figs. 8 to 11, it is not necessary to use any stay-bolts at the top of the fire-box. A fire-box constructed in accordance with my invention therefore entirely avoids the feature of construction of the ordinary fire-box to which its greatest weakness is attributed. Another advantage of this construction is that in case any one tube becomes damaged it is a very simple matter to cut the rivets at either end of said tube and remove it without disturbing any other tube.

As stated above, this form of fire-box is applicable to any type of locomotive-boiler and is such that it can be substituted for the fire-boxes on the locomotives now in common use.

While I have shown herein a few forms in which my invention may be embodied, I do not wish to be limited to the details of construction shown, as various other ways of embodying my invention will come within the scope of the appended claims.

Having described my invention, what I claim as new, and desire to secure by Letters Patent, is—

1. A boiler having a shell provided with a flattened portion, and water-tubes secured to and communicating with said shell, said water-tubes having flattened sides which overlie the flattened portion of the shell, the communication between the tubes and shell being through said flattened sides.

2. A locomotive-boiler having a shell extending over the fire-box, the side of said shell being flattened, and flat-sided water-tubes at the side of the fire-box, the upper ends of said tubes overlying and being secured to the flattened sides of the shell.

3. A locomotive-boiler having a shell extending over the fire-box, the side of said shell being flattened, and flat-sided water-tubes at the side of the fire-box, said water-tubes at their upper ends overlying and being riveted directly to the flattened side of the shell.

4. A locomotive-boiler having a shell provided with a flattened portion, and flat-sided water-tubes at the sides of the fire-box, said water-tubes overlying and being secured directly to the flattened portion of the shell and also having communication with the interior of the shell through their flattened sides.

5. A locomotive-boiler having a shell extending over the fire-box, said shell having flattened sides and flat-sided water-tubes forming the sides of the fire-box, said water-tubes at their upper ends being riveted to the flattened portion of the shell.

6. A locomotive-boiler having a shell extending over the fire-box, said shell having flattened sides, and flat-sided water-tubes forming the sides of the fire-box, said water-tubes at their upper ends being riveted and nippled to the flattened portion of the shell.

7. A locomotive-boiler having a shell extending over the fire-box, said shell having flattened sides, and flat-sided water-tubes forming the sides of the fire-box, said water-tubes at their upper ends being riveted and nippled to the flattened portion of the shell, and headers to which the lower ends of said tubes are secured.

8. A locomotive-boiler having the sides of its fire-box formed by square water-tubes in engagement with each other, and key-pieces tying together adjacent tubes.

9. A locomotive-boiler having the sides of its fire-box formed by square water-tubes in engagement with each other, and key-pieces tying together adjacent tubes, said key-pieces being adapted to be inserted or removed from the outside of the boiler.

10. A locomotive-boiler having the sides of its fire-box formed by closely-arranged water-tubes which are rectangular exteriorly and round interiorly.

11. A locomotive-boiler having the sides of its fire-box formed by flat-sided water-tubes in engagement with each other, and means to tie together the adjacent tubes, headers to which the lower ends of said tubes are secured, the upper ends of said tubes communicating with the steam and water space of the boiler.

12. A locomotive-boiler having the sides of its fire-box formed by flat-sided water-tubes in engagement with each other, and means to tie together the adjacent tubes, headers to which the lower ends of said tubes are secured, the upper ends of said tubes being riveted to and communicating with the interior of the shells which form the steam and water space of the boiler.

13. A fire-box for a locomotive-boiler having its top formed by drums and its sides by flat-sided water-tubes, and means to tie together adjacent tubes.

14. In a locomotive fire-box, a plurality of drums forming the top thereof, and closely-arranged flat-sided tubes forming the sides thereof, the upper ends of said tubes overlying the sides of the drums and being nippled and riveted thereto.

15. In a fire-box for a locomotive-boiler, a plurality of drums forming the top thereof, and closely-arranged water-tubes forming the sides thereof, the outer sides of the outer drums being flattened, and the tubes at the sides of the fire-box being secured to such flattened sides of the drums.

16. In a fire-box for locomotive-boilers, a plurality of drums forming the top thereof, and closely-arranged flat-sided water-tubes forming the sides thereof, the outer sides of the outer drums being flattened and the upper ends of the tubes at the sides of said fire-box being secured thereto.

17. In a fire-box for a locomotive-boiler, a plurality of drums forming the top thereof, the outer sides of the outer drums being flattened, and a plurality of flat-sided tubes forming the sides of the fire-box, the sides of the tubes forming the sides of the fire-box overlying and being secured to the flattened sides of the drums.

18. In a fire-box for a locomotive-boiler, a plurality of flat-ended drums forming the top thereof, the outer sides of the outer drums being flattened, and closely-arranged flat-sided water-tubes forming the side walls of the fire-box, the inner flat sides of said tubes having their upper ends overlying and being riveted and nippled to the flattened ends and flattened sides of the drums.

19. In a fire-box for a locomotive-boiler, a plurality of flat-ended drums forming the top thereof, the outer sides of the outer drums being flattened, and closely-arranged flat-sided water-tubes forming the side walls of the fire-box, the inner flat sides of said tubes having their upper ends overlying and being riveted and nippled to the flattened ends and flattened sides of the drums each tube having an aperture on its outer face opposite the corresponding nipple, and a removable plug to fill such aperture.

20. In a fire-box for a locomotive-boiler, a plurality of drums forming the top thereof, closely-arranged flat-sided water-tubes forming the sides thereof, said tubes at their upper ends being connected to the drums, and key-pieces tying together adjacent tubes.

21. In a fire-box for a locomotive-boiler, a plurality of longitudinally-extending drums forming the top of the fire-box, closely-arraged water-tubes forming the sides of said fire-box, said water-tubes being square exteriorly and rounded interiorly and being secured at their upper ends to the drums, and key-pieces tying together adjacent tubes.

22. In a locomotive-boiler, a plurality of drums forming the top of the fire-box, said drums being secured at one end to the flue-sheet, and flat-sided tubes forming the sides of the fire-box, said tubes being secured at their upper ends to the drums.

23. In a locomotive-boiler, a plurality of drums forming the top of the fire-box, said drums having inturned flanges at one end which are riveted to the flue-sheet, and flat-sided water-tubes forming the sides of the fire-box, said tubes being riveted and nippled at their upper ends to the drums.

24. In a locomotive-boiler, a plurality of drums forming the top of the fire-box, said drums having inturned flanges at one end which are riveted to the flue-sheet, and the outer sides of the outer drums being flattened, and closely-arranged flat-sided water-tubes forming the sides of the fire-box, said water-tubes overlying the flattened sides of the drums and being nippled and riveted thereto.

25. In a locomotive-boiler, a plurality of drums forming the top of the fire-box, means to secure one end of each drum to the front flue-sheet, the outer drums projecting beyond the area of said sheet, and stiffening-plates overlying the boiler-shell and connecting the same to the projecting ends of the drums.

26. In a fire-box for a locomotive-boiler, a plurality of longitudinally-extending drums forming the top of the fire-box, closely-arranged flat-sided water-tubes forming the sides thereof, and flat-sided headers to which the lower ends of said tubes are secured.

27. In boiler construction, a steam and water chamber having flattened sides and flat-sided water-tubes forming the sides of the boiler, said tubes being riveted and nippled to the flattened sides of said chamber.

28. In boiler construction, a flat-sided steam and water chamber at the top of the boiler, and flat-sided water-tubes at the sides of the boiler, said water-tubes having their sides nippled and riveted to the flattened sides of said chamber.

29. In boiler construction, a flat-sided steam and water chamber at the top of the boiler and flat-sided water-tubes at the sides of the boiler, said water-tubes having their sides nippled and riveted to the flattened sides of said chamber, and means to tie together adjacent tubes.

In testimony whereof I have signed my name to this specification in the presence of two subscribing witnesses.

JAMES M. McCLELLON.

Witnesses:
  LOUIS C. SMITH,
  WILLIAM W. GRUNDY.